US007100888B1

(12) United States Patent
Johnson

(10) Patent No.: US 7,100,888 B1

(45) Date of Patent: Sep. 5, 2006

(54) INTERLOCKING CONTROL HANDLE

(76) Inventor: Michael Chad Johnson, 4062 Hwy. 188, Ochlokonee, GA (US) 31773

(*) Notice: Subject to any disclaimer, the term of this patent is extended or adjusted under 35 U.S.C. 154(b) by 0 days.

(21) Appl. No.: 11/097,419

(22) Filed: Apr. 1, 2005

(51) Int. Cl.
*F16K 35/02* (2006.01)

(52) U.S. Cl. .......................... 251/93; 251/95; 251/102; 251/106

(58) Field of Classification Search .................. 251/90, 251/91, 93, 95, 97, 102, 106
See application file for complete search history.

(56) References Cited

U.S. PATENT DOCUMENTS 943,838 A * 12/1909 Miller ........................ 251/105
951,878 A 3/1910 Dolan
1,043,281 A 11/1912 Wilton
1,266,937 A 5/1918 Haselwander
1,412,720 A * 4/1922 Szafranski .................. 70/176
1,561,059 A * 11/1925 Danko ......................... 251/93
1,590,074 A * 6/1926 Booker ........................ 251/93
1,787,775 A 1/1931 Campbell
4,274,445 A * 6/1981 Cooper ........................ 251/95
5,213,308 A * 5/1993 Jeromson et al. ............. 251/95
5,363,880 A 11/1994 Hsieh
5,449,144 A 9/1995 Kowalics
5,513,831 A 5/1996 Seward
5,741,003 A 4/1998 Segien, Jr.
5,762,317 A 6/1998 Frahm et al.
6,019,345 A 2/2000 Bullard

* cited by examiner

*Primary Examiner*—John Bastianelli
(74) *Attorney, Agent, or Firm*—John Wiley Horton

(57) ABSTRACT

An interlocking control valve which can be used to control the flow of fluids such as water and gas. The control valve features a push button on the end of a handle which permits the interlocking valve to engage the valve stem when the push button is pressed. A fixed washer is provided with a hole-and-groove cutout, thereby preventing rotation of the handle with respect to the washer unless the push button is pressed.

20 Claims, 8 Drawing Sheets

52
20
24
16
60
56
58
18
26
28
22
38

INTERLOCKING CONTROL HANDLE

BACKGROUND OF THE INVENTION

1. Field of the Invention

This invention relates to the field of valves used to control the flow of fluids. More specifically, the invention comprises an interlocking control handle which can be employed as a safety device for preventing a child from actuating a gas or water valve.

2. Description of the Related Art

Conventional water faucets feature control valves which a user can rotate to actuate water flow. Various control schemes are used in the prior art for control of water flow from a faucet. One common scheme employs two control valves, where one control valve regulates the volumetric flow rate of water from a hot stream and a second control valve regulates the volumetric flow rate of water from a cold stream. In this control scheme the hot water stream and cold water stream mix before the water is discharged from the faucet. A second common control scheme involves a single control valve which regulates the temperature of the water discharged from the faucet. In this scheme a single valve regulates the ratio of hot water volume to cold water volume. Sometimes an additional control valve is provided to control the overall flow rate of water through the faucet.

These conventional flow control valves are generally easy to operate as only a small amount of torque or rotational force is required to turn the valve. This can present a hazardous condition for a small child who is left unsupervised around a bath tub or shower. Incidents of drowning or scalding are not uncommon since most parents cannot always be aware of what their children are doing.

Although many inventors have sought to make a child-proof control valve, many of these devices have presented their own drawbacks. One problem with many of these prior art devices is that many adults find the devices too cumbersome to use. It is therefore desirable to provide a new control valve that is both child-proof and comfortable for adults to use.

BRIEF SUMMARY OF THE INVENTION

The present invention is an interlocking control valve which can be used to control the flow of fluids such as water and gas. The control valve features a push button on the end of a handle which permits the interlocking valve to engage the valve stem when the push button is pressed. A fixed washer is provided with a hole-and-groove cutout, thereby preventing rotation of the handle with respect to the washer unless the push button is pressed.

The invention provides all of these features, advantages, and objects along with others that will become apparent with reference to the following description and accompanying drawings.

REFERENCE NUMERALS IN THE DRAWINGS

| | | | |
|---|---|---|---|
| 10 | interlocking controller | 12 | push button |
| 14 | mount shaft | 16 | handle |
| 18 | valve stem | 20 | spring |
| 22 | button shaft | 24 | spring bracket |
| 26 | fixed washer | 28 | button stem |
| 34 | cutout | 36 | key |
| 38 | mount plate | 40 | slit |
| 42 | screw holes | 44 | groove |
| 46 | hole | 48 | mounting surface |
| 50 | notches | 52 | detachable end |
| 54 | valve stem keyway | 56 | valve stem receiver |
| 58 | screw hole | 60 | tightening screw |

DETAILED DESCRIPTION OF THE INVENTION

Figure 1:
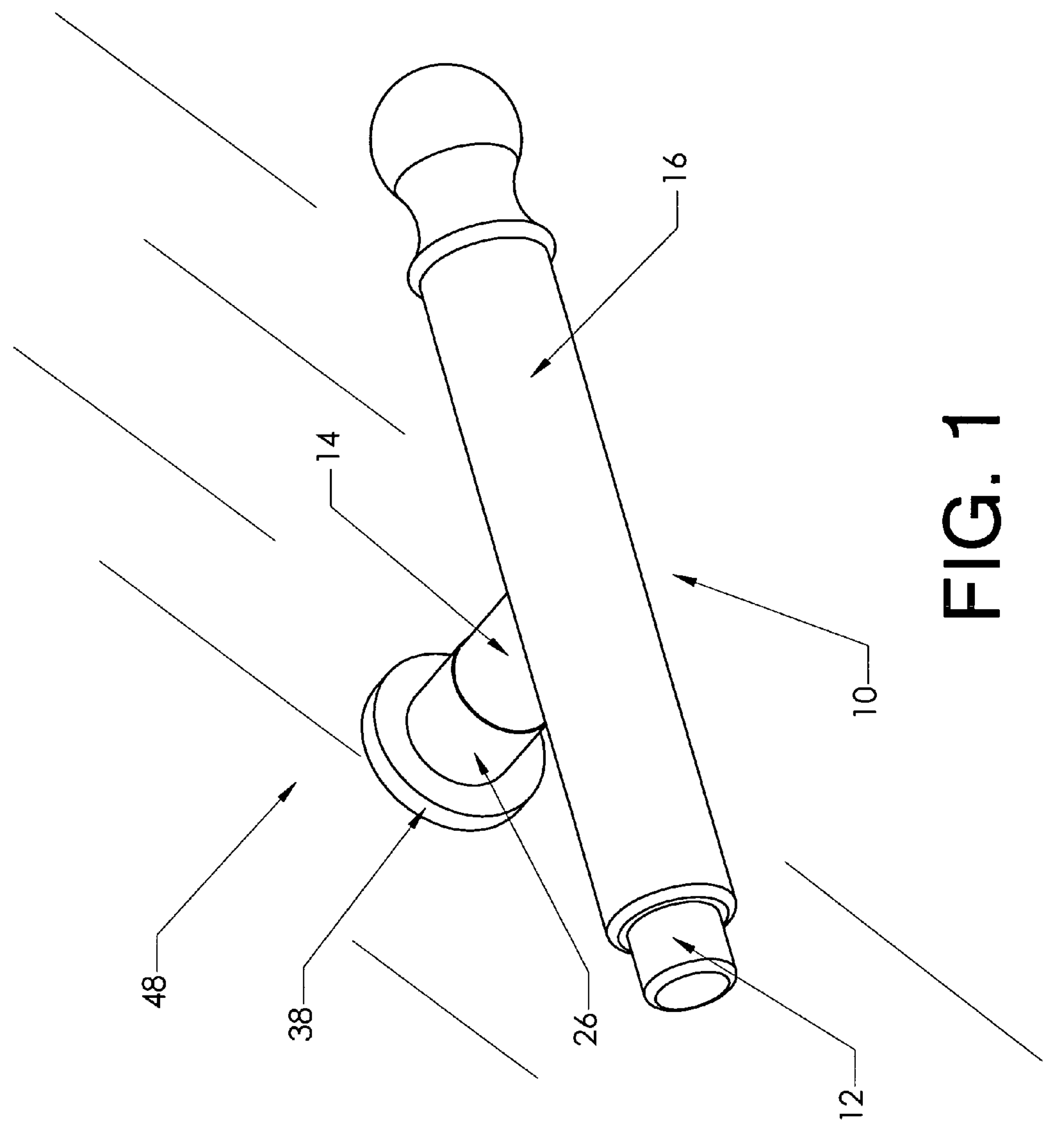
FIG. 1 is a perspective view, showing the external components of the present invention.

The external features of the present invention are shown in FIG. 1. Interlocking controller 10 is provided for control of fluid flow through a valve. Interlocking controller 10 is mounted to a valve stem (not shown) protruding from mounting surface 48. Mounting surface 48 in customary applications is usually a shower wall or counter top. The controller is generally composed of handle 16, mount shaft 14, fixed washer 26, and mount plate 38. Handle 16 is illustrated as a simple bar-type handle but can be any shape conducive to gripping. Push button 12 is positioned on one side of handle 16. The reader will note that bar-type handle design and location of push button 12 provides a comfortable gripping surface as the user is able to position their thumb over push button 12 and wrap the other four fingers around handle 16.

Figure 2:
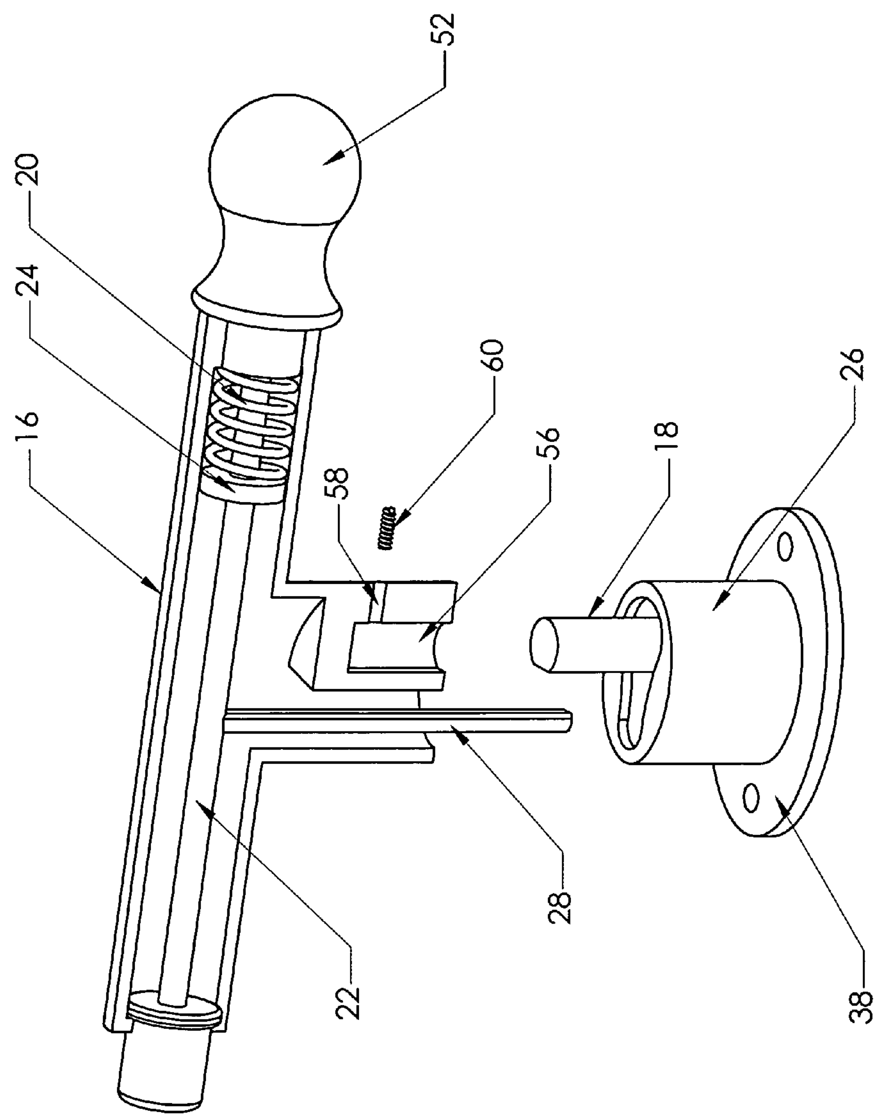
FIG. 2 is a cut-away view, showing the internal components of the present invention.

The internal components of the interlocking control handle are shown in FIG. 2. A preferred embodiment of the interlocking controller has detachable end 52 at the end of handle 16 opposite push button 12. Detachable end 52 is made detachable to facilitate the assembly of the internal components of the handle. Button shaft 22 is spring-biased to bear against push button 12. Spring 20 and spring bracket 24 are provided to supply resistance to the movement of push button 12 in the direction of detachable end 52. The force supplied by the spring is ideally adapted so that a young child would be unable to press push button 12 into handle 16. The resistive force is ideally limited, however, to that which can be overcome by the normal hand strength of an older child or adult.

Push button 12 is seated within a bore in handle 16 in such a manner that it is free to move a fixed distance within the handle. Accordingly, push button 12 can be positioned in either the pushed position or the unpushed position.

Button stem 28 is attached in substantially perpendicular relation to button shaft 22. A preferred embodiment of the invention utilizes a threaded attachment of the button stem 28 to button shaft 22 for simpler manufacture and assembly. In this version, button stem 28 has a threaded shank (not shown) which can be threadedly connected to a threaded bore on button shaft 22. The attachment means could just as easily be reversed in that button stem 28 could have a threaded bore and button shaft 22 could have a threaded shank.

The interlocking controller is also provided with valve stem receiver 56 which functions to connect the controller to valve stem 18. Valve stem 18 passes through mount plate 38 and through fixed washer 26 and is finally received within valve stem receiver 56. Various mechanism can be used to connect fixed valve stem 18 to valve stem receiver 56. A simple means to attach valve stem 18 to valve stem receiver 56 and mount shaft 14 of handle 16 is illustrated in FIG. 2. Screw hole 58 is provided in mount shaft 14 for receiving tightening screw 60. When valve stem 18 is inserted into valve stem receiver 56, the installer can screw in tightening screw 60, thereby preventing the accidental detachment of handle 16 from valve stem 18.

The reader will note that button stem 28 also passes through fixed washer 26. This feature causes the handle to be locked when the push button is in the unpushed position and unlocked when the push button is in the pushed position as will be explained subsequently.

Figure 3:
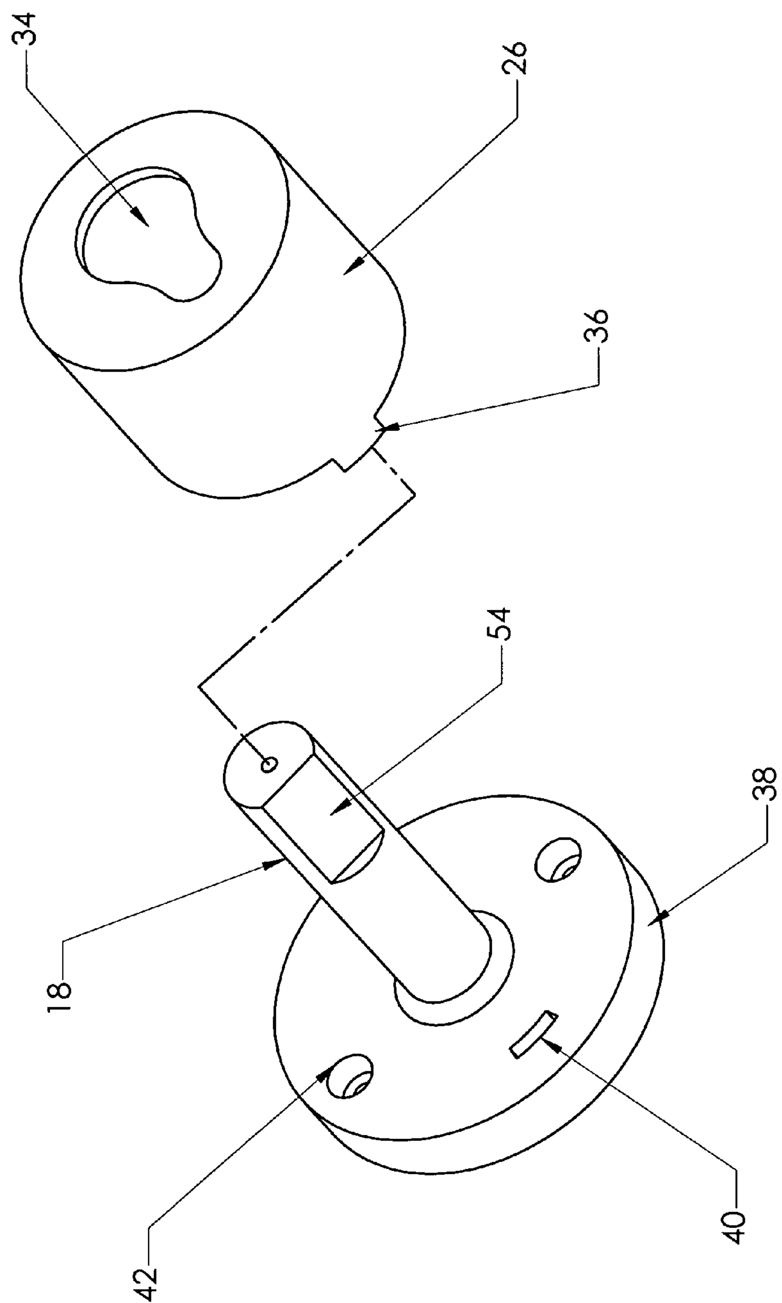
FIG. 3 is an exploded view, showing the fixed washer.

FIG. 3 illustrates the attachment of fixed washer 26 and mount plate 38. Fixed washer 26 has cutout 34 and key 36. Mount plate 38 is placed over valve stem 18 and can be attached to the mounting surface by screwing mount plate 38 to the mounting surface through screw holes 42. Slit 40 is also provided for receiving key 36 of fixed washer 26 when it is placed over valve stem 18. Multiple slits 40 can be placed around mount plate 38 (in a circle) and multiple keys 36 can be placed around the lower perimeter of fixed washer 26 to ensure that the orientation of cutout 34 does not accidentally change with respect to mount plate 38 when the handle is turned. The use of multiple slits and multiple keys also allows the installer to finely adjust the orientation of fixed washer 34 so that the locked position of the handle corresponds with the off position of the valve.

Figure 4A:
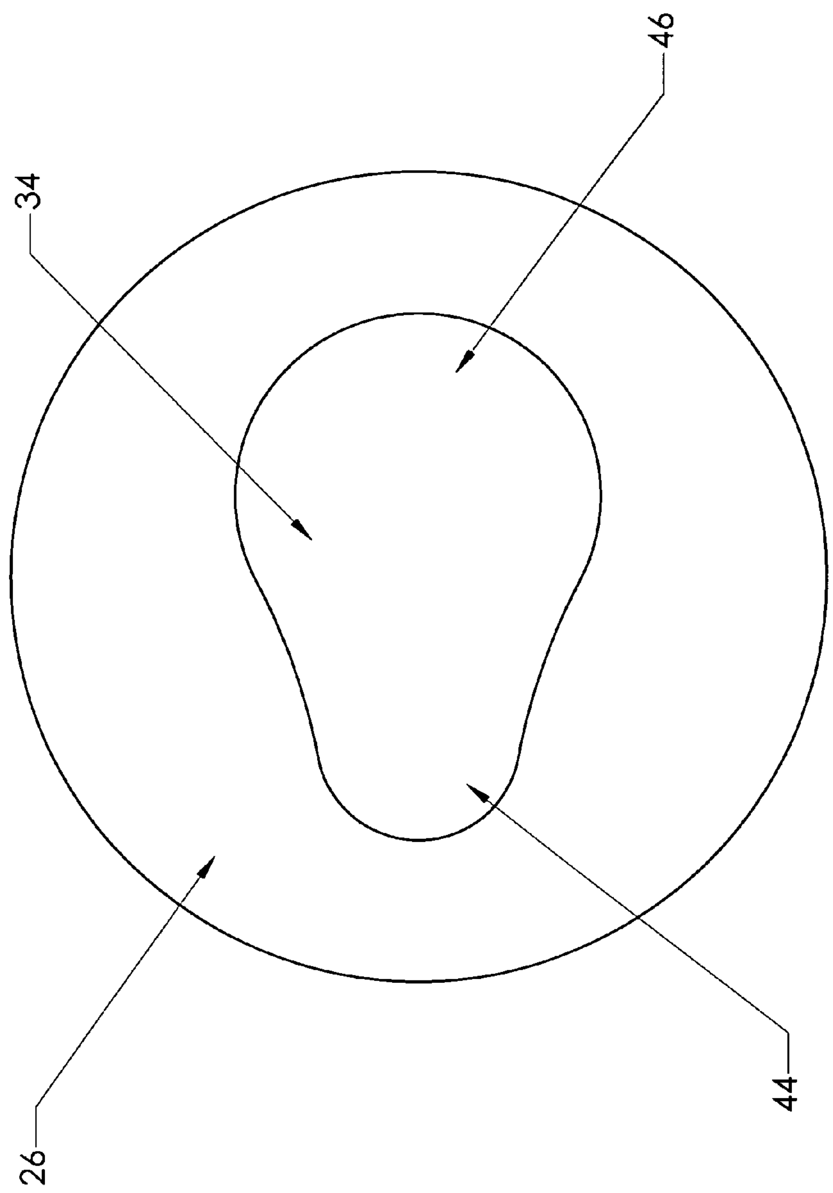
FIG. 4A is a top view, showing an embodiment of the fixed washer.
Figure 4B:
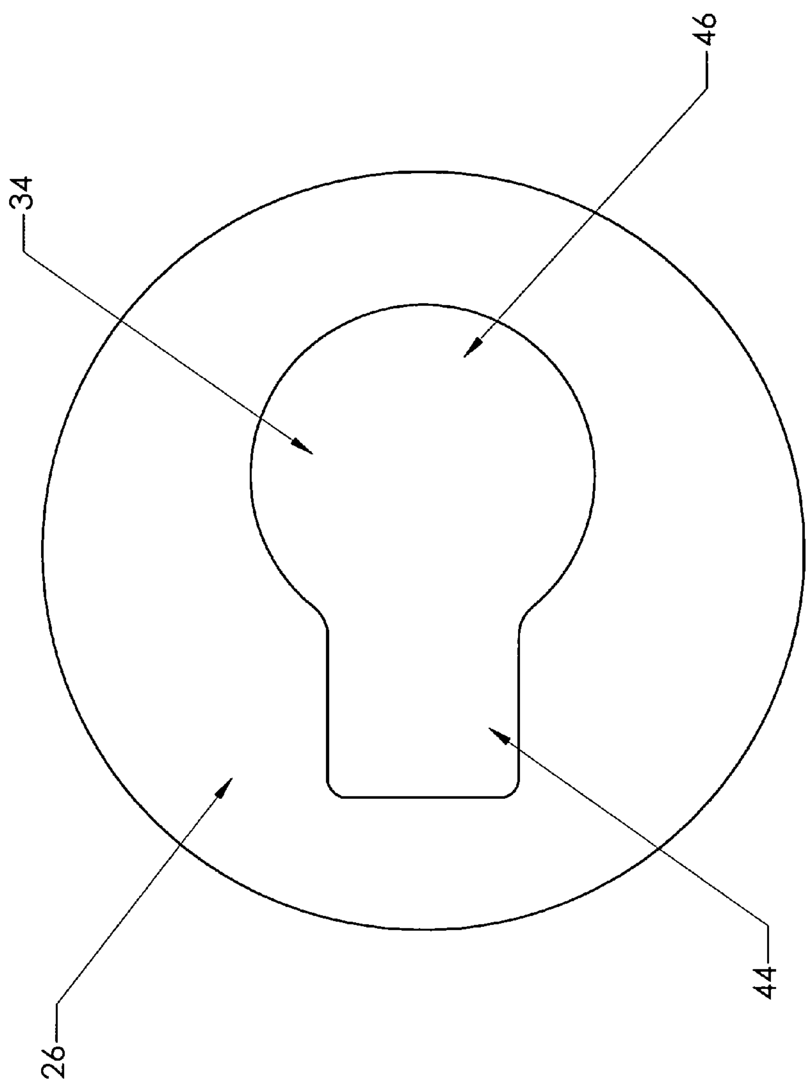
FIG. 4B is a top view, showing an embodiment of the fixed washer.
Figure 4C:
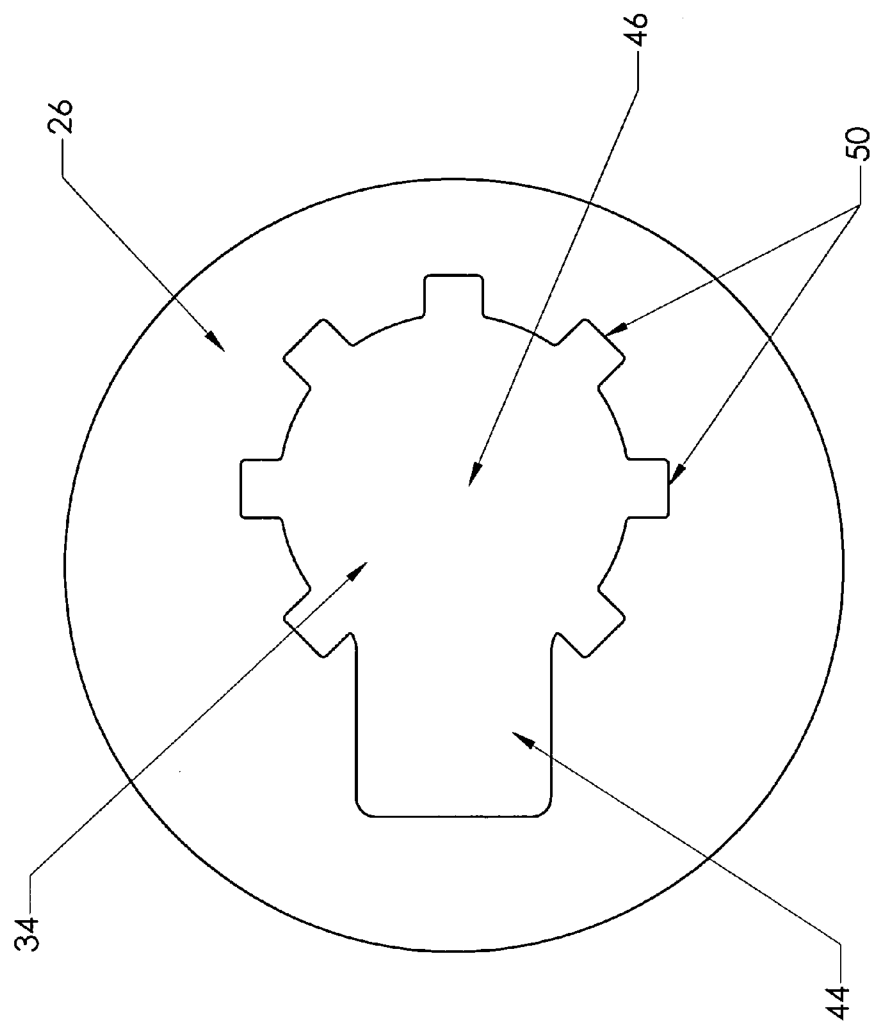
FIG. 4C is a top view, showing an embodiment of the fixed washer.

Several versions of fixed washers are illustrated in FIGS. 4A, 4B, and 4C. FIG. 4A shows the top of fixed washer 26 with cutout 34 which is comprised of hole 46 and groove 44. As explained above, fixed washer 26 is adapted so that it does not move relative to mount plate 38 and mounting surface 48. Groove 44 is adapted to receive button stem 28 when push button 12 is in the unpushed position. Hole 46 is large enough to receive button stem 28 and mount shaft stem 32 when the push button 12 is in the pushed position, thereby allowing the two components to be rotated within hole 46 when handle 16 is turned. Because of the shape of cutout 34 and the stationary nature of fixed washer 26, handle 12 cannot turn when push button 12 is in the unpushed position and button stem 28 is positioned in groove 44.

FIG. 4B shows another version of fixed washer 26 and cutout 34. In this version, groove 44 and hole 46 appear more distinct, unlike the fixed washer in FIG. 4A which smoothly contours the two components together.

A third version of the fixed washer is shown in FIG. 4C. This version features notches 50 in hole 46. Notches 50 allow the valve to be locked in various incremental positions. This feature not only prevents a small child from turning on the water faucet but also prevents them from adjusting the temperature once it has been set.

Figure 5A:
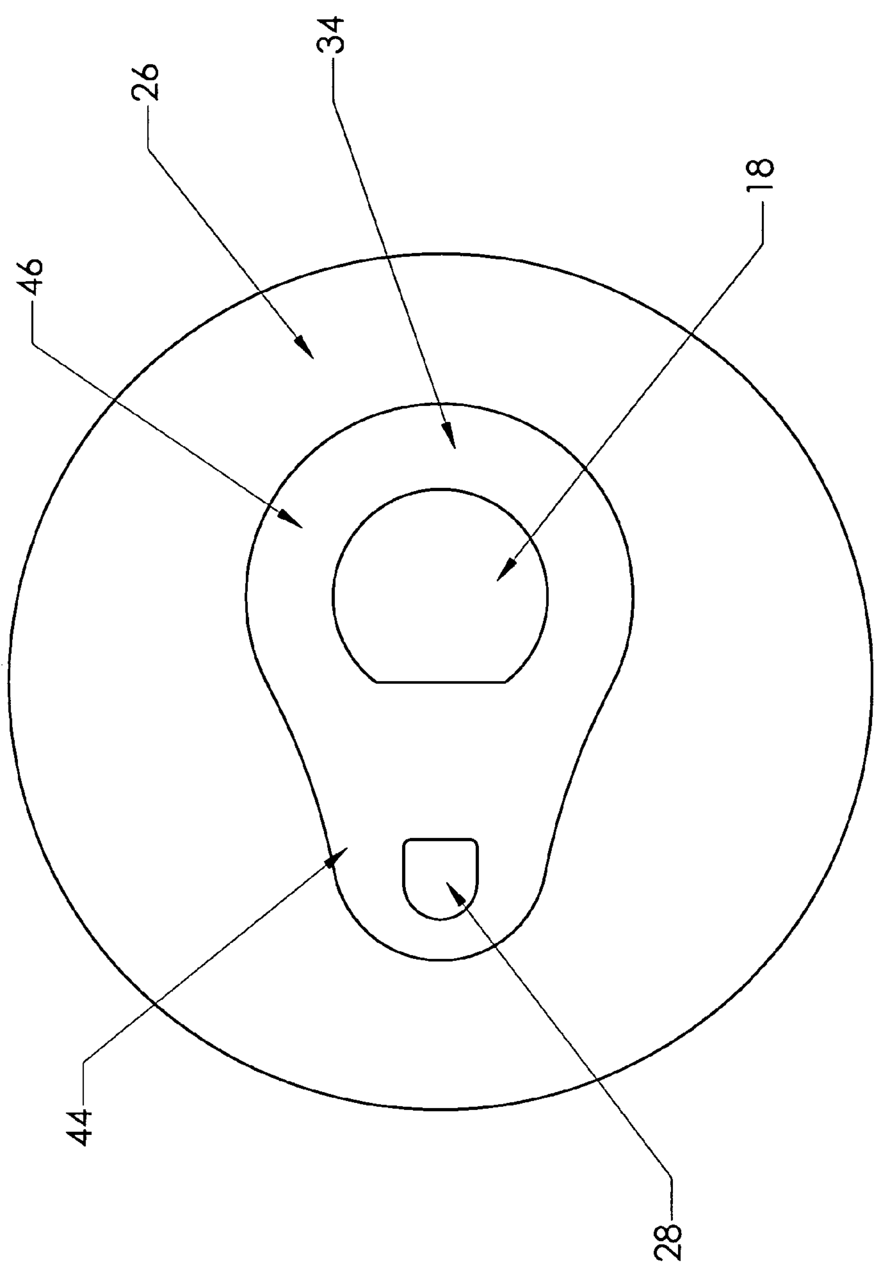
FIG. 5A is a cross-section view, showing the present invention in the locked position.
Figure 5B:
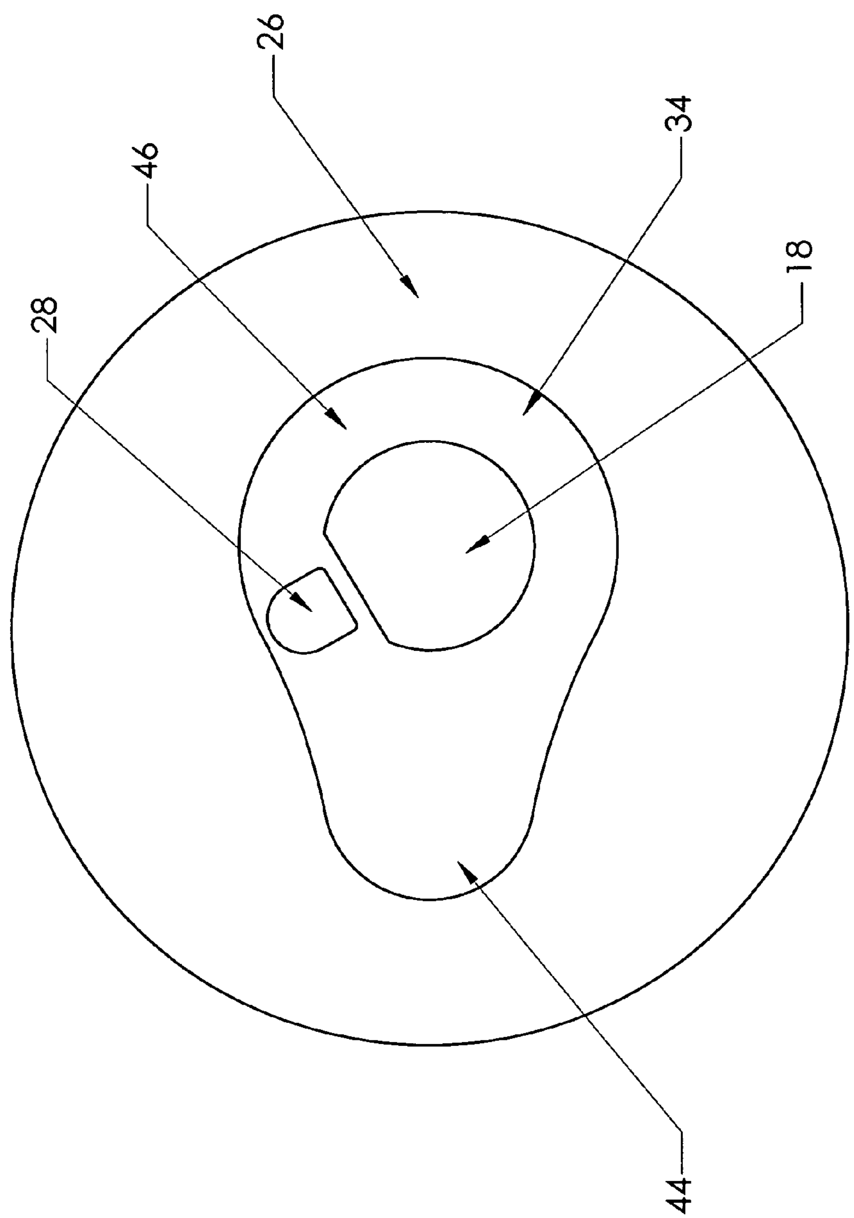
FIG. 5B is a cross-section view, showing the present invention in the unlocked position.

FIGS. 5A and 5B illustrate cross-sectional views the internal components of the interlocking controller when the push button is in the unpushed position and the pushed position. The cross-sections are observed directly above the top of fixed washer 26 and directly below the bottom of mount shaft 14. Push button 12 is shown in the unpushed position in FIG. 5A. The reader will observe the relationship between push button 12 and the position of button stem 28 with respect to cutout 34 and button stem groove 30. When in the unpushed positing button stem 28 is seated in groove 44 of fixed washer 26. Valve stem 18 is seated in hole 46, but because of the shape of cutout 34 and the location of button stem 28 within groove 44, handle 16 will not turn.

FIG. 5B illustrates the internal components of the interlocking controller assembly when push button 12 is in the pushed position and the handle is slightly turned. As shown in FIG. 5B cutout 34 does not restrict the movement of handle 16 when push button 12 is in the pushed position. Button stem 28 mates against the outside of valve stem receiver 56 when the push button is pushed. Accordingly, the space between button stem 28 and valve stem 18 represents the width of valve stem receiver 56. The reader will observe that button stem 28 and valve stem 18 jointly occupy hole 46 thereby permitting the handle to be turned.

The reader will appreciate that in each of the above mentioned embodiments of the present invention, the restricting means (such as cutout 34 and other components of the invention responsible for restricting the movement of interlocking controller 10) are substantially enveloped by interlocking controller 10. This feature prevents the critical moving parts responsible for restricting the movement of interlocking controller 10 from being exposed to the environment and the user, thereby preventing injury to the user and damage to interlocking controller 10.

The preceding description contains significant detail regarding the novel aspects of the present invention. It should not be construed, however, as limiting the scope of the invention but rather as providing illustrations of the preferred embodiments of the invention. As an example, many variations of hole 46 and groove 44 can be utilized for cutout 34, and notches 50 can be included an any of these variations. Such a variation would not alter the function of the invention. In addition, many shapes could be used for the handle without departing from the spirit and scope of the present invention. Thus, the scope of the invention should be fixed by the following claims, rather than by the examples given.

I claim:

1. A child-safe interlocking controller for attachment to a valve for use by a user comprising:

a. a handle, said handle having a gripping portion and a mounting portion, wherein said gripping portion further comprises a bore;

b. a valve stem;

c. a valve stem attachment, said valve stem attachment attaching said handle to said valve stem;

d. a push button, said push button insertedly situated within said bore of said handle, wherein said push button can slide in and with respect to said bore;

e. a button shaft, said button shaft spring-biased to bear against said push button causing said push button to remain in an unpushed position, and wherein said button shaft provides limited resistance to said user's pushing said push button into a pushed position;

f. a button stem, said button stem attached to said button shaft;

g. a fixed washer, wherein said fixed washer has a cutout, and wherein said cutout has a groove and a hole;

h. wherein said groove is adapted to receive said button stem when said push button is situated in said unpushed position; and i. wherein said hole is adapted to receive said valve stem and button stem when said push button is situated in said pushed position, thereby permitting said user to rotate said handle and said valve stem attachment.

2. The child-safe interlocking controller of claim 1, said cutout further comprising a plurality of notches.

3. The child-safe interlocking controller of claim 1, said fixed washer further comprising a key.

4. The child-safe interlocking controller of claim 2, said fixed washer further comprising a key.

5. The child-safe interlocking controller of claim 1, wherein said button shaft is perpendicularly attached to said button shaft stem.

6. The child-safe interlocking controller of claim 2, wherein said button shaft is perpendicularly attached to said button shaft stem.

7. The child safe interlocking controller of claim 3, wherein said button shaft is perpendicularly attached to said button shaft stem.

8. The child-safe interlocking controller of claim 3, further comprising a mount plate and a slit in said mount plate, wherein said slit is adapted for receiving said key of said fixed washer.

9. The child-safe interlocking controller of claim 4, further comprising a mount plate and a slit in said mount plate, wherein said slit is adapted for receiving said key of said fixed washer.

10. The child-safe interlocking controller of claim 1, said valve stem attachment further comprising a mount shaft.

11. The child-safe interlocking controller of claim 1, said handle further comprising a valve stem receiver adapted for receiving said valve stem.

12. A child-safe interlocking controller for attachment to a valve for use by a user comprising:

a. a handle, said handle having a gripping portion and a mounting portion, wherein said gripping portion further comprises a bore;

b. a valve stem attachment, said valve stem attachment attaching said handle to said valve;

c. a push button, said push button insertedly situated within said bore of said handle, wherein said push button can slide in and with respect to said bore;

d. a button shaft, said button shaft spring-biased to bear against said push button causing said push button to remain in an unpushed position, and wherein said button shaft provides limited resistance to said user's pushing said push button into a pushed position;

e. a restricting means for restricting the rotation of said handle, wherein said restricting means permits said rotation of said handle when said push button is in said pushed position, and wherein said restricting means prevents said rotation of said handle when said push button is in said unpushed position; and f. wherein said restricting means is substantially enveloped by said handle.

13. The child-safe interlocking controller of claim 12, said restricting means further comprising a fixed washer.

14. The child-safe interlocking controller of claim 12, said restricting means further comprising a cutout.

15. The child-safe interlocking controller of claim 14, said cutout comprising a hole and a groove, said groove joined with said hole.

16. The child-safe interlocking controller of claim 13, said fixed washer further comprising a cutout.

17. The child-safe interlocking controller of claim 16, said cutout comprising a hole and a groove, said groove joined with said hole.

18. The child-safe interlocking controller of claim 12, further comprising a button stem, said button stem attached to said button shaft.

19. The child-safe interlocking controller of claim 15, further comprising a button stem, said button stem attached to said button shaft, and wherein said hole is adapted to receive a valve stem and said button stem when said push button is situated in said pushed position, thereby permitting said user to rotate said handle and said valve stem attachment.

20. The child-safe interlocking controller of claim 17, further comprising a button stem, said button stem attached to said button shaft, and wherein said hole is adapted to receive a valve stem and said button stem when said push button is situated in said pushed position, thereby permitting said user to rotate said handle and said valve stem attachment.

* * * * *